United States Patent
Gervasi et al.

(10) Patent No.: US 7,556,368 B2
(45) Date of Patent: *Jul. 7, 2009

(54) PHASE CHANGE MARKING SYSTEMS WITH RELEASE AGENTS

(75) Inventors: David J. Gervasi, Webster, NY (US); Santokh S Badesha, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 533 days.

This patent is subject to a terminal disclaimer.

(21) Appl. No.: 11/455,611

(22) Filed: Jun. 19, 2006

(65) Prior Publication Data

US 2007/0291092 A1 Dec. 20, 2007

(51) Int. Cl.
*B41J 2/01* (2006.01)

(52) U.S. Cl. .................. 347/103; 347/88; 347/99; 347/95

(58) Field of Classification Search ............... 347/103, 347/101, 88, 99, 100, 95, 96; 523/160; 106/31.6, 106/31.13, 31.27; 399/328
See application file for complete search history.

(56) References Cited

U.S. PATENT DOCUMENTS

| 3,253,932 A | * | 5/1966 | White et al. | 106/38.22 |
| 3,577,501 A | * | 5/1971 | York | 264/213 |
| 7,374,853 B2 | * | 5/2008 | Takenouchi | 430/120.1 |

FOREIGN PATENT DOCUMENTS

JP 09001309 * 1/1997

* cited by examiner

*Primary Examiner*—Manish S Shah
(74) *Attorney, Agent, or Firm*—James J. Ralabate

(57) ABSTRACT

This is a phase change marking system with the ability to minimize adherence of a marking composition to a component in the system, such as an imaging member. In this manner, offset is avoided and a better image results on the paper or receiving medium. This is accomplished by using a substituted polyolefin as a release agent that is coated on the surface of the imaging member.

13 Claims, 1 Drawing Sheet

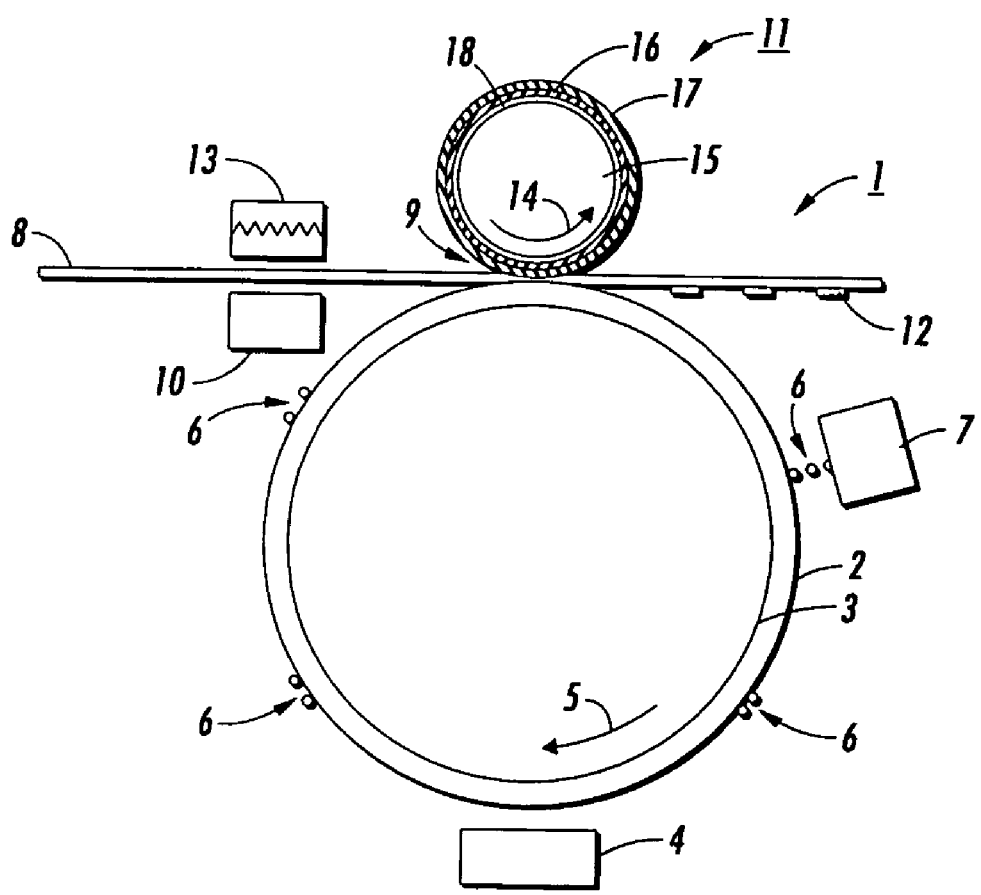

PHASE CHANGE MARKING SYSTEMS WITH RELEASE AGENTS

This invention relates to marking systems and, more specifically, to phase change ink based marking systems with improved release agents.

CROSS REFERENCES

In U.S. application Ser. No. 11/455,612 an electrophotographic marking system using a polyolefin release agent is disclosed and claimed. This application and the present application are both owned by the same assignee and both are being concurrently filed in the U.S. Patent and Trademark Office. The disclosures of both applications are incorporated into the other by reference.

BACKGROUND

Phase change ink based marking systems or ink jet printing systems are well known in the art. In some of these systems, an imaging surface or roller is positioned in an operative relationship with a print head. In embodiments solid inks are used whereby a final receiving surface or print medium is brought into contact with the imaging surface after the image has been placed thereon by the print head. The image is then transferred and fixed to the final receiving surface by the imaging member in combination with a transfix pressure member. This process begins by first applying a thin liquid or release agent such as silicone oil to the imaging medium or member surface. The present embodiments of this invention are concerned with replacing this silicone oil release agent in an ink jet or transfix system with a substantially improved release agent comprising a poly-alpha olefin.

Ink jet printing systems of the type disclosed herein are described in U.S. Pat. Nos. 4,538,156; 5,502,476; 5,389,958 and 6,196,675.

Generally, a solid or phase change ink jet marking comprises: a source of ink; one or more print heads each having at least one ink jet for discharging droplets of ink; a transfer or imaging medium or member having a moving surface adjacent to but spaced apart from the jet of each print head; circuitry for controlling the print head to project droplets of ink onto the imaging medium to create patterns of droplets thereon, and an arrangement for transferring the droplets from the imaging or transfer medium to paper or another printing medium. If not all of the ink or oil is transferred to the printing medium, it is necessary to clean the imaging medium prior to the time that new indicia are placed thereon. Actually, the imaging member in these types of systems have a dual function; first the ink jet print heads prints images on the imaging member; thus, it is used as an imaging member, secondly, after receiving the images, the image is then transfixed to a final print medium, so this member provides a transfix function in addition to an imaging function.

The proper release agents are important in these types of systems to improve diffusion into the paper bulk more readily than the currently practiced polyorganisiloxanes. These silicone oils interact with the surface of both coated and un-coated paper stocks resulting in a thick layer of this remaining on these surfaces. The thin layer of release oils on surface of the images adversely affects the customer end use applications which include the ability to write on the surface, post it notes adhesion, bookbinding, etc. This results in significant customer dissatisfaction.

The use of polymeric release agents having functional groups which interact with a marking component to form a thermally stable, renewable self-cleaning layer having good release properties for electroscopic thermoplastic resin toners are described in, for example, U.S. Pat. Nos. 4,029,827, 4,101,686 and 4,185,140, the disclosures of each of which are totally incorporated herein by reference.

In ink jet marking systems and subsystems, silicone fluids are presently predominantly used as release agents. There are many associated defects and failure modes associated with the use of these fluids, especially when they are employed in machines printing full colors and requiring longer service life. Functional silicone oils are by nature chemically and physically susceptible to reaction with many other species in the environment, such as inks and ink additives, ink components, components of the paper, etc. Side reactions with these species can lead to premature gelation, ink offset slime, image defects, which ultimately lead to shortened component and subsystem operation life. This life shortfall directly impacts operation costs incurred by both manufacturers and customers. As earlier noted, end use applications in particular are negatively impacted by the use of amine-functional silicone fluids, as the amine functionality interacts with the surface of both coated and un-coated paper stocks. This leaves a persistent film on the surface that inhibits adhesives, US overcoats write-ability, post-it notes use, book binding, and other end use elements from properly functioning. Low viscosity polydimethyl siloxane (PDMS) improves Solid ink jet print quality in many areas, but cannot be lowered any further due to limitations of volatility in low viscosity silicone fluids. PAO may provide similar benefits as low viscosity (10 cP) silicone, but at higher viscosities, thus at a lower volatility. This is based on the fact that silicone fluids are slightly miscible with phase change inks, and PAO fluids are more miscible with phase change inks.

SUMMARY

The present embodiments provide the use of hydrocarbon or poly-alpha olefin (PAO) based fluids for release agent applications, directly replaces the use of silicone fluids. Hydrocarbon fluids can be manufactured for improved thermal stability and can be modified to include functional side chains for enhanced performance with specific surfaces. A primary advantage, noted above, of hydrocarbon fluids over silicone related to end use applications is the improved diffusion into paper bulk more readily than amine functional silicones. Specially modified hydrocarbon based fluids also have been shown to work effectively in monochrome xerographic fusing applications, and their use in color printing applications are effective as well.

The silicon fluid is normally functionalized with either amino functional, fluoro-functional or mercapato functional side chains in order to facilitate wettability and surface coverage of transfix components. Silicone oil is by nature thermally and chemically stable. However, the harsh environment of ink jet printing can lead to thermal and chemical degradation and side reaction with inks and ink components. Silicone oil is also quite interactive physically and chemically with these ink components. In addition, an issue that arises more frequently in color printing applications utilizing amine-functional silicone fluid is the inhibition of end use application for color prints. Ink jet printing takes place at temperature ranges closer to 70-120 degrees C., and is not as harsh an environment as xerographic fusing.

The primary behavior that negatively impacts end use applications is silicone oil diffusion into the bulk of paper. When the release agent layer splitting occurs at the imaging drum, oil is transferred to the paper, and retained on the imaging member. Ideally, the release agent would diffuse into the paper before the adhesive was or other end use applications steps took place. However, the currently practiced amino-functional silicone oil adheres to the surface of both coated and uncoated paper. This limits the overall diffusion of silicone oil into the bulk of the paper, and negatively impacts inline end use processing by way of the silicone oil interfering with adhesives and components of other end-use applications, such as overcoat varnishes and bookbinding materials.

The use of hydrocarbon fluids offers an alternate release fluid that does not cause wetting and adhesion issues on the surface of prints as does the amine-functional silicone oil. The hydrocarbon fluids should diffuse more readily into paper, reducing the amount of oil on the paper surface after fusing. In addition, hydrocarbon fluids are not as repellant to end use materials as silicone oil, so the inhibition that occurs with silicone oil will not occur with hydrocarbon fluids should some release agent remain on the paper surface. In addition, hydrocarbon fluids are significantly cheaper than the silicone fluids, thereby resulting in lower cost per copy to the customers. Hydrocarbon based fluids may also impart print quality benefits to the solid ink jet printing process, enabling lower cost frames and components.

This invention provides the use of hydrocarbon or poly-alpha olefin (PAO) based fluids for release layer applications directly replacing silicone release agents or fluids in ink jet systems. Hydrocarbon fluids similar to silicone fluids can be modified to provide functional interaction with select release surface materials. The polyalpha olefin (PAO) release agents provide print quality improvements, lower cost, fewer end use dysfunctions and less negative interaction with other species in the environment. Specifically, fluid cost would be much less than that of typical silicone release agents. This fluid is a viable candidate for use in mono/color xerographic printers as well as in the present solid ink jet systems. Bench experiments demonstrate PAO surface wetting & contact angle measurements on standard Viton and silicone slabs to be similar to that of silicone oils, suggesting comparable surface coverage and perhaps overall release.

The release agents of the present embodiments may be used in any marking system where a release agent is used to prevent adherence of the marking materials to the fixing or transfixing component(s). The present subsystem useful is a marking system comprises in an operative arrangement, image marking and fixing component(s), a source of marking material and a source of a release agent. The release agent is enabled to minimize adherence of the marking material to the fixing component(s). The release agent used is a substituted polyolefin. The release agent-fluid is a single poly-alpha olefin (PAO) component or blend of the following polyolefin materials with the general formulas:

A: $CH_3-(CH_2)_m-CHR_1-(CH_2)_n-CH_3$ where $R_1$ is an amine, mercapto, ester, hydroxyl, fluoroalkyl or carboxylic acid functional group of $C_4$-$C_{20}$. m+n=20-720 and m=0-720 and n=0-720

B: $R_1-(CH_2)_p-R_2$ p=20-720, $R_1$ is same as A. above and $R_2=R_1$ or $CH_3$.

C: $CH_3-(CH_2)_m-CHR_3-(CH_2)_n-CH_3$ where R3 is $-(CH_2)_q-R_1$ where q=1-200.

D: $CH_3-(CH_2)_p-CH_3$

The basic structure for the materials of the release agents of this invention is a backbone of polyethylene, synthesized as linear compounds to make a fluid with a range of viscosity of: For solid ink jet applications, 5-300 cP, preferably 10-100 cP; for Xerographic fusing applications, either 300-100 cP, preferably 500-700 cP (color applications) or 500-5000 cP, preferably 1000-2000 cP. The release fluid should be comprised of two components. The first component should be a poly-alpha olefin (hydrocarbon) containing a functional chemical group that promotes wetting and adhesion of the bulk fluid to the intended substrate material. The second component should be a poly-alpha olefin (hydrocarbon) containing no special or additional chemical groups. The primary function of the second component is to dilute the viscosity and functional group concentration to a desired level for the specific application.

In one embodiment such as a mono or color ink jet system, the release agent is applied first to the imaged drums, then the toner image is transferred to a paper receiving member and fixed by a multi-layer elastomer transfix roll.

Generally in most systems about 5-12 milligrams of release agent is applied per page of receiving member, in a mono system from 0.5-5 milligrams are applied per page, and in a direct marking system like ink jet from a bout 1-7.0 milligrams are applied per 8½" by 11" page of receiving member. As noted earlier, the release agent of this invention can be used in any suitable marking system where a release agent is required to ink or marking material from a fixing means, such as a transfix roll.

BRIEF DESCRIPTION OF DRAWINGS

FIG. 1 illustrates an embodiment of an ink jet system using the release agent of this invention.

DETAILED DISCUSSION OF THE DRAWINGS AND PREFERRED EMBODIMENTS

FIG. 1 illustrates an offset printing apparatus or system 1 useful with phase-change inks such as solid inks and comprising a coated transfix pressure member 3, which aids in the transfer and fixing of a developed ink image to a copy substrate. In embodiments, the transfix pressure member 3 is useful in high speed, high pressure printing applications. In embodiments, the transfix pressure member 3 comprises a substrate and an outer layer thereon. The details of embodiments of phase-change ink printing processes are described in the patents referred to above, such as U.S. Pat. Nos. 5,502,476, 5,389,958 and 6,196,675 B1, the disclosures of each of which are hereby incorporated by reference in their entirety.

Offset printing apparatus or system 1 is demonstrated to show transfer of an ink image from the imaging member to a final printing medium or receiving substrate 8. As the imaging member 3 turns in the direction of arrow 5, a liquid release agent surface 2 is deposited on imaging member 3. The imaging member 3 is depicted in this embodiment as a drum member. However, it should be understood that other embodiments can be used, such as a belt member, film member, sheet member, or the like. The liquid release agent layer 2 is deposited by a release agent reservoir using an applicator 4 that may be positioned at any place, as long as the applicator 4 has the ability to make contact and apply liquid surface 2 to imaging member 3. The release agent used is the poly alpha olefin (PAO) above defined.

The ink 6 used in the printing process can be a phase change ink, such as, for example, a solid ink. The term "phase change ink" means that the ink can change phases, such as a solid ink becoming liquid ink or changing from solid into a more malleable state. Specifically, in embodiments, the ink can be in solid form initially, and then can be changed to a molten state by the application of heat energy. The solid ink may be solid at room temperature, or at about 25 degrees C. The solid ink may possess the ability to melt at relatively high temperatures and then the melted ink 6 is ejected from print head 7 onto the liquid layer 2 of imaging member 3. The ink is then cooled to an intermediate temperature of from about 20 degrees C. to about 80 degrees C., or about 65 degrees C., and solidifies into a malleable state in which it can then be transferred onto a final receiving substrate 8 or print medium 8.

The ink has a viscosity of from about 5 to about 30 centipoise, or from about 8 to about 20 centipoises, or from about 10 to about 15 centipoise at about 140 degrees C. The surface tension of suitable inks is from about 23 to about 50 dynes/cm. Examples of a suitable inks for use herein include those described in U.S. Pat. Nos. 4,889,560, 5,919,839, 6,174,937, and 6,309,453, the disclosure each of which are hereby incorporated by reference in their entirety.

Some of the liquid release agent layer 2 can transfer to the print medium 8 along with the ink. A typical thickness of transferred liquid is about 100 angstroms to about 100 nanometer, or from about 0.1 to about 200 milligrams, or from about 0.5 to about 50 milligrams or from about 0.5 to about 10 milligrams per print medium.

Suitable release agent liquids used as the print liquid surface 2 include a substituted polyolefin solution comprising a single poly-alpha olefin or a blend of polyolefin materials with the following general formulas:

A: $CH_3-(CH_2)_m-CHR_1-(CH_2)_n-CH_3$ where $R_1$ is selected from the group consisting of an amine, mercapto, ester, hydroxyl, fluoroalkyl or carboxylic acid functional group of $C_4$-$C_{20}$ and m=0-720 and n=0-720, however, at least 1 m or 1 n is present and m+n=20-720.

B: $R_1-(CH_2)_p-R_2$ p=20-720, $R_1$ is same as A. above and $R_2=R_1$ or $CH_3$.

C: $CH_3-(CH_2)_m-CHR_3-(CH_2)_n-CH_3$ where R3 is $-(CH_2)_q-R_1$ where q=1-200.

D: $CH_3-(CH_2)_p-CH_3$

Feed guide(s) 10 and 13 help to feed the print medium 8, such as paper, transparency or the like, into the nip 9 formed between the pressure member 11 (shown as a roller), and imaging member 3. It should be understood that the pressure member can be in the form of a belt, film, sheet, or other form. In embodiments, the print medium 8 is heated prior to entering the nip 9 by heated feed guide 13. When the print medium 8 is passed between the imaging member 3 and the transfix pressure member 11, the melted ink 6 now in a malleable state is transferred from the imaging member 3 onto the print medium 8 in image configuration. The final ink image 12 is spread, flattened, adhered, and fused or fixed to the final print medium 8 as the print medium moves between nip 9. The nip width is from about 2.0 to about 6.0 or from about 3.0 to about 5.5 mm. Alternatively, there may be an additional or alternative heater or heaters (not shown) positioned in association with offset printing apparatus 1. In another embodiment, there may be separate optional fusing station located downstream of the feed guides.

The pressure exerted at the nip 9 in known machines is from about 200 to about 1200 psi. However, the present transfix pressure member must allow for exertion at the nip 9 of from about 550 to about 4,000 or from about 700 to about 3,000 psi, or from about 800 to about 2,000. Therefore, the present transfix pressure member must be configured so as to allow for an increase of over 5-fold pressure.

Stripper fingers (not shown) may be used to assist in removing the print medium 8 having the ink image 12 formed thereon to a final receiving tray (also not shown).

The transfix pressure member comprises substrate 15 intermediate layer 16 and outer layer 17 positioned on the substrate 15. In embodiments, an outer liquid layer (not shown) is present on the outer layer 17. In embodiments, an intermediate layer 16 may be positioned between the substrate 15 and outer layer 17. In embodiments, an under layer 18 may be positioned on the substrate, an intermediate layer positioned on the under layer and an outer layer 17 positioned on the intermediate layer.

In embodiments, the outer layer comprises a urethane material, such as a polyurethane material. Examples of suitable polyurethanes include polyester-based polyurethanes.

In other embodiments, the transfix pressure member 15 has a one-layer or two layer configuration, which includes a substrate and an outer layer. In this one-layer configuration, the modulus of the outer layer is from about 8 to about 300 MPa or from about 25 to about 250 MPa or from about 50 to about 200 MPa. The thickness of the outer layer in the one-layer configuration is from about 0.3 to about 10 mm or from about 1 to about 8 mm or from about 2 to about 6 mm.

It will be appreciated that various of the above-disclosed and other features and functions, or alternatives thereof, may be desirably combined into many other different systems or applications. Various presently unforeseen or unanticipated alternatives, modifications, variations or improvements therein may be subsequently made by those skilled in the art which are also intended to be encompassed by the following claims.

What is claimed is:

1. A phase change ink marking system comprising in an operative arrangement an imaging member, a pressure transfix roller, at least one paper file guide, at least one print head, a cleaning station and a release agent reservoir, said reservoir enabled to coat said release agent on said imaging member prior to said marking, said cleaning station enabled to remove excess marking material and said release agent from said imaging member subsequent to said marking, said release agent being applied in an amount sufficient to cover said surface with at least a continuous, low surface energy fluid film of said release agent to provide said imaging member with a release agent enabled to reduce adherence of marking material to said imaging member, said release agent comprising a substituted polyolefin solution comprising a single poly-alpha olefin or a blend of polyolefin materials with the following general formulas:

A: $CH_3-(CH_2)_m-CHR_1-(CH_2)_n-CH_3$ where $R_1$ is selected from the group consisting of an amine, mercapto, ester, hydroxyl, fluoroalkyl or carboxylic acid functional group of $C_4$-$C_{20}$ and m=0-720 and n=0-720, however, at least 1 m or 1 n is present and m+n=20-720;

B: $R_1-(CH_2)_p-R_2$ p=20-720, $R_1$ is same as A. above and $R_2=R_1$ or $CH_3$.

C: $CH_3-(CH_2)_m-CHR_3-(CH_2)_n-CH_3$ where R3 is $-(CH_2)_q-R_1$ where q=1-200.

D: $CH_3-(CH_2)_p-CH_3$.

2. The system of claim 1 wherein monochrome ink jet marking system components are used.

3. The system of claim 1 wherein color ink jet marking system components are used.

4. The system of claim 1 wherein said marking material is selected from the group consisting of solid marking material, liquid marking material and mixtures thereof.

5. The system of claim 1 wherein said polyolefin has a viscosity of at least 5 cP.

6. The system of claim 1 wherein the polyolefin has volatile matter of less than 10%.

7. The system of claim 1 wherein the polyolefin has a viscosity of from about 10 cP to about 100 cP and volatile matter of from about 0 to about 10% by weight.

8. The system of claim 1 wherein said reservoir is enabled to dispense a release agent coating of at least 1,000 mm on said imaging member.

9. The system of claim 1 wherein the marking material is a number selected from the group consisting of solid marking materials, liquid inks, and mixtures thereof.

10. The system of claim 1 wherein said system is selected from the group consisting of monochromic marking systems, color marking systems and mixtures thereof.

11. The system of claim 1 wherein said release agent is a poly-alpha olefin having selected functional side chains adapted for use with selected appropriate photoconductive surfaces.

12. The system of claim 1 wherein suitable functional side chains are provided to enhance the thermal stability of said release agents.

13. The system of claim 1 wherein said release agent is enabled to reduce wetting and adhesion of said marking material on the surface of a receiving medium.

* * * * *